Oct. 12, 1926.  
E. H. WIRTH  
PLOW  
Filed Feb. 3, 1926  
1,602,423
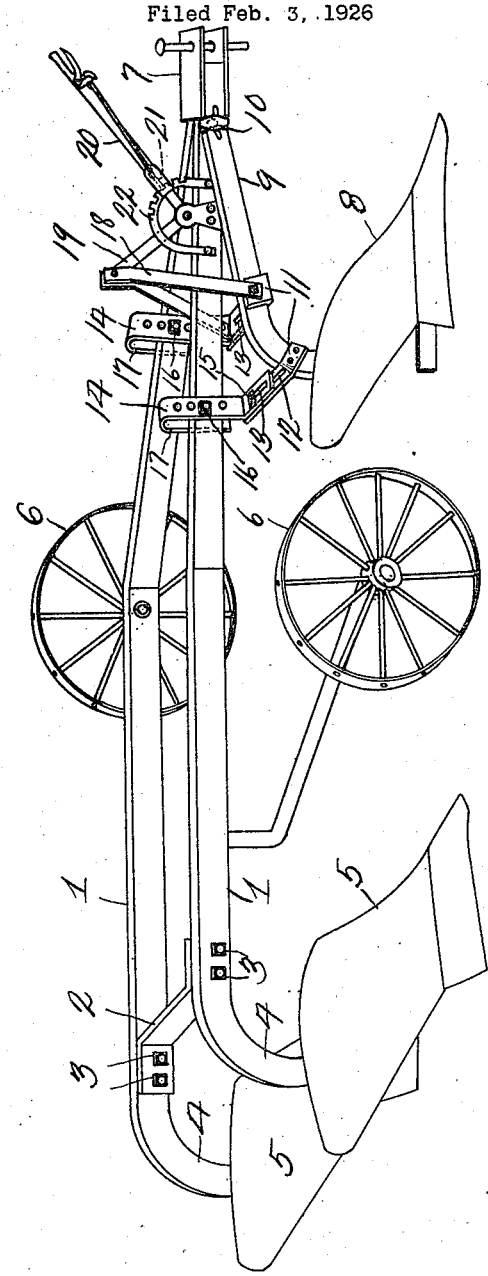
INVENTOR.  
E. H. Wirth  
BY  
Philip A. H. Sewell  
ATTORNEY.

Patented Oct. 12, 1926.

1,602,423

UNITED STATES PATENT OFFICE.

EMIL H. WIRTH, OF DUNBAR, NEBRASKA.

PLOW.

Application filed February 3, 1926. Serial No. 85,676.

The invention relates to plows and has for its object to provide means for plowing the ground at the ends of the fields which is ordinarily left unplowed as the regular plows discontinue plowing several feet from the end of the field, hence it is necessary, when the field has been plowed, to plow that portion adjacent the end of the field crosswise of the field thus causing a loss of time. Also to provide in addition to the two mold boards and shares an extra mold board and share disposed far enough ahead of the other plows to plow and turn over the ground considerable in advance of that which is plowed by the first mentioned plows.

A further object is to provide an extra mold board and share carried by the front part of the plow frame and which acts as a guide leading the other plows.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing; the single figure shows a perspective view of a conventional form of wheel supported plow showing the device applied thereto, and in which figure the numeral 1 designates the spaced beams of the plow which are held at their rear ends in spaced relation by means of a transversely disposed brace 2, the ends of which are secured to the beams 1 by means of bolts 3. The rear ends of the beams 1 are provided with downwardly extending arms 4, which carry at their lower ends the plows 5. The beams 1 are provided with ground engaging wheels 6 which operate in the usual manner. The forward ends of the beams 1, forwardly of the wheels 6 converge and are provided with a clevis 7, to which a tractor may be hitched in the usual manner. It will be noted the plows 5 are disposed rearwardly of the wheels 6, consequently when the operator reaches the ends of the rows during a plowing operation, a considerable portion of the ground is not plowed. The present practice is to plow this space at a right angle to the furrows after a plowing of the field, which entails a loss of considerable time, and to obviate this difficulty the auxiliary plow 8 is provided, which auxiliary plow is disposed forwardly of the wheels 6 and adjacent the forward ends of the beams 1, therefore it will be seen the furrow will be plowed to the turning point, and the after plowing operation referred to above is obviated.

The plow 8 is carried by a beam 9 which extends forwardly and is universally connected at 10 to the forward ends of the beams 1, and is adapted to be raised at the end of the furrow during the turning operation. Connected to the beam 9 are brackets 11, which brackets extend inwardly and are provided with slots 12 which register with slots 13 in brackets 14 carried by the beams 1, and through which registering slots bolts 15 extend. The brackets 14 are secured to the beams 1 by means of bolts 16, however the bolts 16 may be eliminated if desired and the U-shaped portions 17 of brackets 14 utilized as guiding means during the upward and downward movement of the plow beam during a plowing operation. Pivotally connected to the brackets 14 is an upwardly extending bracket 18, to which is pivotally connected the arm 19 of a pivoted lever 20, and which lever 20 is provided with a detent 21 which cooperates with a toothed segment 22 for holding the lever 20 in various adjusted positions in vertical plane, as the plow is preferably raised at the end of the furrow before the turning operation. By providing the slots 12 and 13 and the bolts 15 the beam 9 may be adjusted inwardly or outwardly for alining the same in relation to the plows 5.

From the above it will be seen that an auxiliary plow is provided in connection with a gang plow and which is located adjacent the forward end of the plow whereby a maximum length of furrow may be turned before turning the plow around.

The invention having been set forth what is claimed as new and useful is:—

1. The combination with a gang plow frame comprising spaced beams, of an auxiliary plow adjacent the forward end of said beams, a universal connection between said last named plow and the forward ends of the beams and means whereby said plow may be adjusted upwardly or downwardly and laterally.

2. The combination with an auxiliary plow universally connected to the forward end of a gang plow frame, said frame being formed from spaced beams, of brackets carried by said beams, said brackets having horizontal portions extending outwardly to one side of the frame and connected to the plow, means for varying the length of the horizontal portions of the brackets, said brackets being vertically adjustable on the beams, a pivoted lever carried by one of the beams, an upwardly extending arm carried by said lever and a link connection between the upwardly extending arms and one of the brackets.

In testimony whereof I affix my signature.

EMIL H. WIRTH.